United States Patent
Yang et al.

(10) Patent No.: US 12,363,514 B2
(45) Date of Patent: Jul. 15, 2025

(54) METHOD AND APPARATUS FOR PERFORMING WIRELESS COMMUNICATION IN WIRELESS COMMUNICATION SYSTEM SUPPORTING VEHICLE COMMUNICATION

(71) Applicant: Innovative Technology Lab Co., Ltd., Seoul (KR)

(72) Inventors: Hyo Sun Yang, Seoul (KR); Ki Bum Kwon, Seoul (KR)

(73) Assignee: Innovative Technology Lab Co., Ltd., Seoul (KR)

(*) Notice: Subject to any disclaimer, the term of this patent is extended or adjusted under 35 U.S.C. 154(b) by 649 days.

(21) Appl. No.: 17/156,231

(22) Filed: Jan. 22, 2021

(65) Prior Publication Data
US 2021/0211850 A1  Jul. 8, 2021

Related U.S. Application Data

(63) Continuation of application No. PCT/KR2019/009119, filed on Jul. 23, 2019.

(30) Foreign Application Priority Data

| Jul. 24, 2018 | (KR) | .................. | 10-2018-0086106 |
| Sep. 17, 2018 | (KR) | .................. | 10-2018-0110861 |

(51) Int. Cl.
*H04W 4/40*  (2018.01)
*H04L 1/00*  (2006.01)
(Continued)

(52) U.S. Cl.
CPC ............ *H04W 4/40* (2018.02); *H04L 1/0005* (2013.01); *H04W 72/02* (2013.01); *H04W 80/02* (2013.01); *H04W 92/18* (2013.01)

(58) Field of Classification Search
CPC ....... H04W 4/40; H04W 92/18; H04W 72/02; H04W 80/02; H04L 1/0005
See application file for complete search history.

(56) References Cited

U.S. PATENT DOCUMENTS 10,469,197 B2 * 11/2019 Beale .................... H04L 1/0028
10,582,499 B2    3/2020 Chae et al.
(Continued)

FOREIGN PATENT DOCUMENTS

CN    108029131 A    5/2018
CN    110447271 B * 11/2019 ........... H04L 1/0005
(Continued)

OTHER PUBLICATIONS

"3rd Generation Partnership Project; Technical Specification Group Services and System Aspects; Architecture enhancements for V2X services (Release 15)", 3GPP TS 23.285 V15.1.0 , Jun. 2018, pp. 1-36, 3GPP Organizational Partners.
(Continued)

*Primary Examiner* — Parth Patel

(57) ABSTRACT

Provided is a method of performing, by a user equipment (UE), wireless communication in a wireless communication system, the method including generating a first message and transmitting the generated first message. Here, a transmission format for transmitting the first message may be determined depending on whether transmission profile (Tx profile) information is transmitted from an upper layer of the UE.

8 Claims, 10 Drawing Sheets

(51) Int. Cl.
*H04W 72/02* (2009.01)
*H04W 80/02* (2009.01)
*H04W 92/18* (2009.01)

(56) References Cited

U.S. PATENT DOCUMENTS

| | | | | |
|---|---|---|---|---|
| 11,115,981 | B2* | 9/2021 | Lee | H04W 72/02 |
| 2009/0268735 | A1* | 10/2009 | Gu | H04L 1/0016 |
| | | | | 370/392 |
| 2014/0241168 | A1* | 8/2014 | Merlin | H04W 24/02 |
| | | | | 370/241 |
| 2016/0295624 | A1* | 10/2016 | Novlan | H04L 67/12 |
| 2017/0047979 | A1* | 2/2017 | Sen | H04W 28/0257 |
| 2017/0303218 | A1* | 10/2017 | Blasco Serrano | H04L 5/00 |
| 2018/0063825 | A1 | 3/2018 | Van Phan et al. | |
| 2018/0139593 | A1* | 5/2018 | Chun | H04W 4/46 |
| 2018/0234973 | A1* | 8/2018 | Lee | H04W 88/04 |
| 2019/0110178 | A1* | 4/2019 | Baghel | H04W 4/44 |
| 2019/0124015 | A1* | 4/2019 | Loehr | H04L 5/0058 |
| 2019/0174286 | A1* | 6/2019 | Guo | H04W 72/02 |
| 2019/0174571 | A1* | 6/2019 | Deenoo | H04W 76/11 |
| 2019/0253184 | A1* | 8/2019 | Xing | H04L 1/0026 |
| 2019/0279508 | A1* | 9/2019 | Wang | G05D 1/0278 |
| 2019/0288789 | A1* | 9/2019 | Li | H04W 28/24 |
| 2019/0394624 | A1* | 12/2019 | Karampatsis | H04W 76/14 |
| 2019/0394803 | A1* | 12/2019 | Blasco Serrano | H04W 4/40 |
| 2020/0059327 | A1* | 2/2020 | Kini | H04L 5/0055 |
| 2020/0213033 | A1* | 7/2020 | Chen | H04L 1/0007 |
| 2020/0329352 | A1* | 10/2020 | Wang | H04L 67/12 |
| 2021/0076409 | A1* | 3/2021 | Goto | H04W 72/1268 |
| 2021/0211850 | A1* | 7/2021 | Yang | H04W 72/02 |
| 2021/0321229 | A1* | 10/2021 | Pattan | H04W 4/50 |
| 2023/0007458 | A1* | 1/2023 | Perras | H04W 4/40 |
| 2023/0015536 | A1* | 1/2023 | Goyal | H04B 7/0695 |

FOREIGN PATENT DOCUMENTS

| | | |
|---|---|---|
| EP | 3273634 A1 | 9/1966 |
| TW | 201822559 A | 6/2018 |
| WO | 2014204144 A1 | 12/2014 |
| WO | 2017171251 A1 | 10/2017 |
| WO | 2017222207 A1 | 12/2017 |
| WO | 2018016157 A1 | 1/2018 |

OTHER PUBLICATIONS

"3rd Generation Partnership Project; Technical Specification Group Radio Access Network; Evolved Universal Terrestrial Radio Access (E-UTRA); Physical layer procedures (Release 15)", 3GPP TS 36.213 V15.2.0, Jun. 2018, pp. 1-543, 3GPP Organizational Partners.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.2.0, Jun. 2018, pp. 1-357, 3GPP Organizational Partners.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.2.0, Jul. 2018, pp. 1-126, 3GPP Organizational Partners.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, pp. 1-773, 3GPP Organizational Partners.

International Search Report for International Patent Application No. PCT/KR2019/009119, dated Nov. 26, 2019.

Written Opinion for International Patent Application No. PCT/KR2019/009119, dated Nov. 26, 2019.

ZTE Corporation, "Considerations on Tx profile and transmission format", R2-1806753, 3GPP TSG RAN WG2 Meeting #102, Busan, Korea, May 21-25, 2018, pp. 1-3.

LG Electronics Inc., "The way to represent transmission mechanisms in Tx profile", 3GPP TSG-RAN WG2 Meeting#102, R2-1808549, Busan, Korea, May 21-May 25, 2018, pp. 1-3.

Nokia et al., On the ambiguity of Tx Profile, 3GPP TSG-RAN WG2 Meeting #102, R2-1807889, Busan, Republic of Korea, May 21-25, 2018, pp. 1-2.

Huawei (rapporteur), "Summary of [101bis#84][LTE/V2X]— Discussion on the issues for running RRC CR", 3GPP TSG-RAN WG2 Meeting #102, R2-1807424, Busan, Korea, May 21-25, 2018, pp. 1-24.

OPPO, "Left issues on TX profile indicator", 3GPP TSG-RAN WG2 Meeting#102, R2-1806686, Busan, Korea, May 21-25, 2018, pp. 1-4.

Huawei et al., "Further discussion on the coexistence of R14 UEs and R15 UEs", 3GPP TSG-RAN WG2 Meeting#102, R2-1807430, Busan, Korea, May 21-25, 2018, pp. 1-4.

ITL, "Default operation of Tx profile", 3GPP TSG-RAN2 Meeting#103, R2-1812588, Gothenburg, Sweden, Aug. 20-24, 2018, pp. 1-2.

Extended European Search Report for European Patent Application No. 19 839 952.9.

Examination report under sections 12 & 13 of the Patents Act, 1970 and the Patents Rules, 2003 for Application No. 202117001277 from Intellectual Property India dated May 25, 2022.

R2-1808039; 3GPP TSG-RAN WG2 Meeting #102; Qualcomm Incorporated (rapporteur); Report of email discussion [101bis#81][LTE/V2X] Details of TX Profile; Busan, Republic of Korea, May 21-25, 2018.

* cited by examiner

FIG. 4
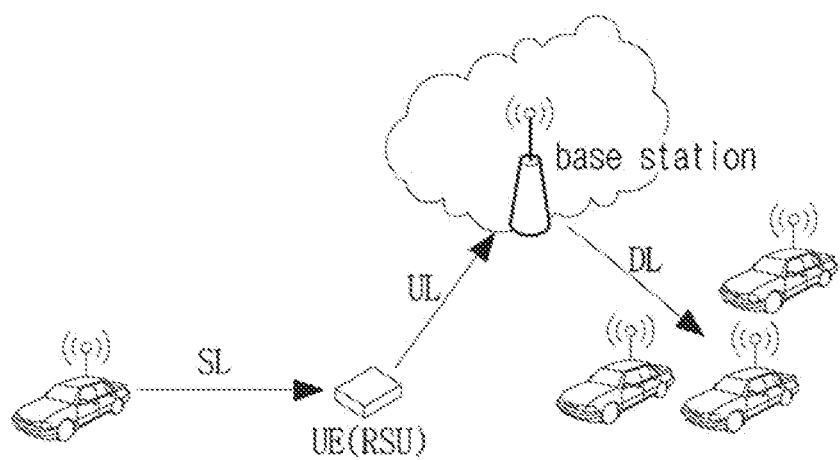
(a)
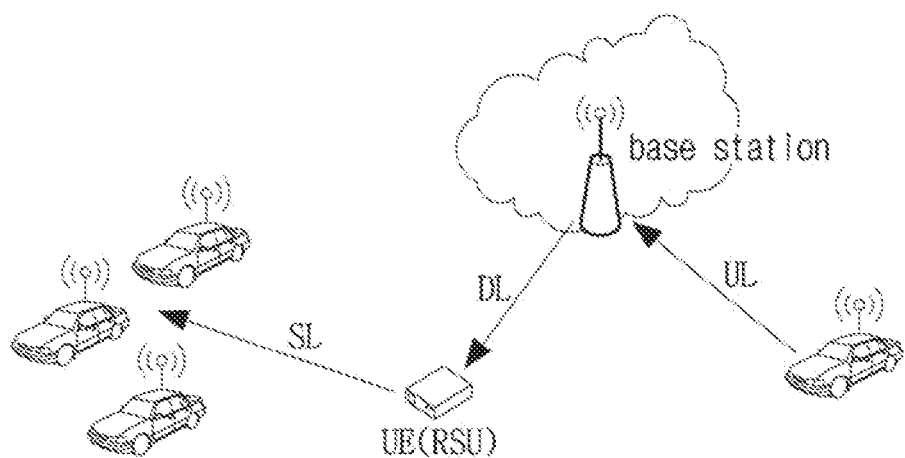
(b)

METHOD AND APPARATUS FOR PERFORMING WIRELESS COMMUNICATION IN WIRELESS COMMUNICATION SYSTEM SUPPORTING VEHICLE COMMUNICATION

CROSS-REFERENCE TO RELATED APPLICATION

This application is a continuation of pending PCT International Patent Application No. PCT/KR2019/009119, filed on Jul. 23, 2019, which claims priority from and the benefit of Korean Patent Application Nos. 10-2018-0086106, filed on Jul. 24, 2018, and 10-2018-0110861, filed on Sep. 17, 2018, each of which is hereby incorporated by reference in its entirety.

BACKGROUND

1. Field

The present disclosure relates to a method and apparatus for performing wireless communication in a wireless communication system supporting vehicle communication.

2. Discussion of the Background

Vehicle-to-everything (V2X) communication refers to a communication scheme that exchanges or shares information, such as traffic conditions, while communicating with road infrastructure and other vehicles during driving. The V2X communication may include vehicle-to-vehicle (V2V) communication that indicates Long Term Evolution (LTE) based communication, vehicle-to-pedestrian (V2P) communication that indicates LTE-based communication between a vehicle and a terminal carriable by an individual user, and vehicle-to-infrastructure/network (V2I/N) that indicates LTE-based communication between a vehicle and a roadside unit/network. Here, the roadside unit (RSU) may be a transportation infrastructure entity that is embodied by a base station or a fixed terminal. For example, the RSU may be an independent entity that transmits a speed notification to a vehicle.

SUMMARY

An aspect of the present disclosure provides one or more methods and apparatuses that address problems, such as unsuccessful reception of one or more packets by a V2X terminals in a wireless communication system supporting vehicle communication.

An aspect of the present disclosure provides one or more methods and apparatuses for transceiving one or more packets between terminals supporting different versions of a wireless communication system supporting vehicle communication.

According to an aspect of the present disclosure, provided is a method of performing wireless communication by a terminal in a wireless communication system. The method may comprise generating a first message and transmitting the generated first message. A transmission format of transmitting the first message may be determined based on whether transmission (Tx) profile information is transmitted from a higher layer of the terminal.

According to an aspect of the present disclosure, one or more methods and apparatuses may address problems, such as unsuccessful reception of one or more packets by a V2X terminals in a wireless communication system supporting vehicle communication.

According to an aspect of the present disclosure, one or more methods and apparatuses may be provided so that one or more packets may be transmitted and received between terminals supporting different versions of a wireless communication system supporting vehicle communication.

Various advantageous effects of one or more features of the present disclosure are not limited to the aforementioned effects, and one of ordinary skill in the art would readily understand other various advantageous effects not explicitly discussed in the present disclosure in view of one or more features of the present disclosure described hereinafter.

BRIEF DESCRIPTION OF THE DRAWINGS

FIG. 4 illustrates another example of a link considered in V2X according to an example embodiment.

DETAILED DESCRIPTION

Figure 1:
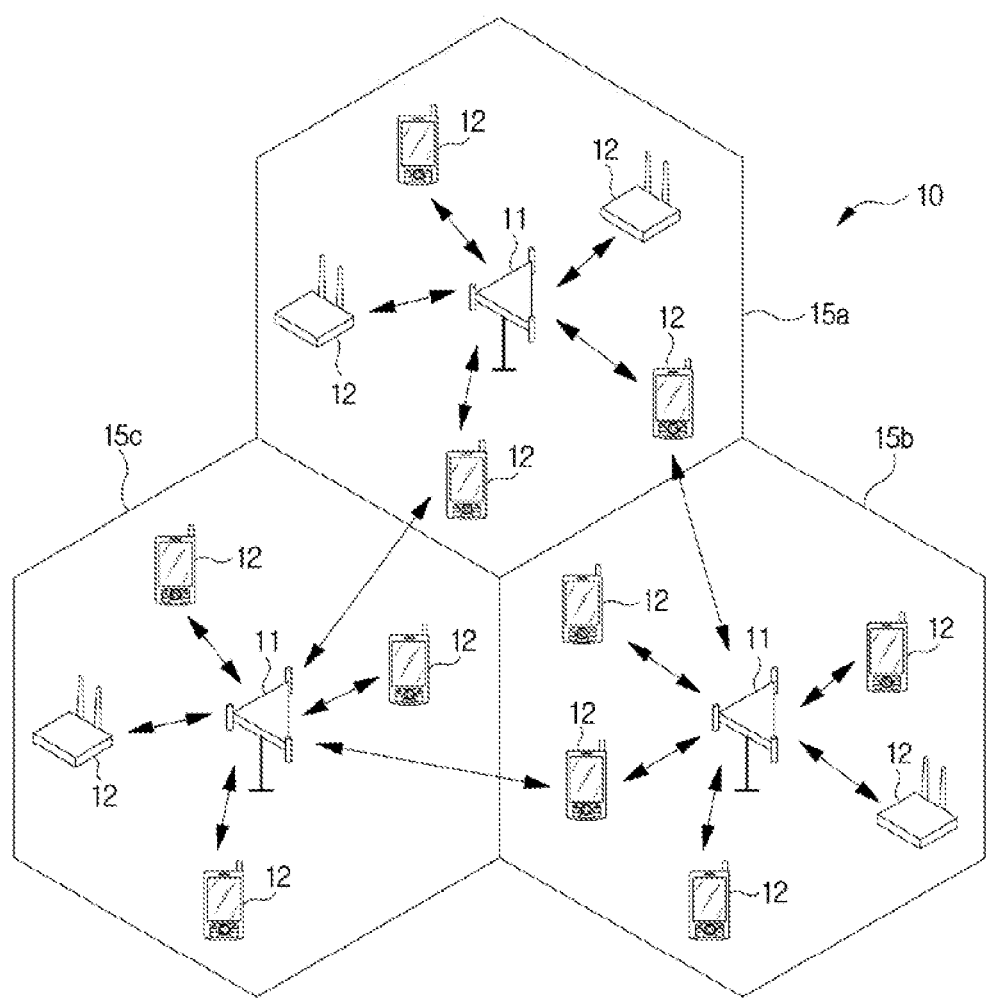
FIG. 1 illustrates an example of a wireless communication system according to an example embodiment.

Hereinafter, embodiments of the present disclosure will be described in detail so that those skilled in the art can easily carry out the embodiments referring to the accompanying drawings. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, when an element is referred to as being "connected", "coupled", or "connected" to another element, it is understood to include not only a direct connection relationship but also an indirect connection relationship. Also, when an element is referred to as "containing" or "having" another element, it means not only excluding another element but also further including another element.

In the present disclosure, the terms first, second, and so on are used only for the purpose of distinguishing one element from another, and do not limit the order or importance of the elements unless specifically mentioned. Thus, within the scope of this disclosure, the first component in an embodiment may be referred to as a second component in another embodiment, and similarly a second component in an embodiment may be referred to as a second component in another embodiment.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, but some may be optional components. Accordingly, embodiments consisting of a subset of the components described in an embodiment are also included within the scope of this disclosure. Also, embodiments that include other components in addition to the components described in the various embodiments are also included in the scope of the present disclosure.

Further, the description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

FIG. 1 is a diagram illustrating a wireless communication system to which the present disclosure is applied.

The network structure illustrated in FIG. 1 may be the network structure of Evolved-Universal Mobile Telecommunications System (E-UMTS). E-UMTS may include the long term evolution (LTE) system, the LTE-A system, or the like, or may include the 5G mobile communication network, new radio (NR), or the like.

Referring to FIG. 1, in a wireless communication system 10, a base station (BS) 11 and a user equipment (UE) 12 may wirelessly perform transmission and reception of data. Also, the wireless communication system 10 may support device-to-device (D2D) communication between UEs. Hereinafter, a UE includes terminal devices used by general users, such as a smart phone and the like, and terminal devices installed in vehicles. D2D communication in the wireless communication system will be described later.

The BS 11 in the wireless communication system 10 may provide a communication service to a UE placed in the coverage of the BS 11 via a predetermined frequency band. The coverage within which a BS provides a service is also referred to as a site. The site may include various areas 15a, 15b, and 15c, which may be referred to as sectors. The sectors included in the site may be identified by different identifiers. Each sector 15a, 15b, and 15c may be construed as a part of the area that the BS 11 covers.

The BS 11 may generally refer to a station that communicates with the UE 12, and may be referred to as an evolved-NodeB (eNodeB), a base transceiver system (BTS), an access point, a femtoeNodeB, a home eNodeB (HeNodeB), a relay, a remote radio head (RRH), or the like.

The UE 12 may be a stationary or mobile entity, and may be referred to as a mobile station (MS), a mobile terminal (MT), a user terminal (UT), a subscriber station (SS), a wireless device, a personal digital assistant (PDA), a wireless modem, a handheld device, or the like.

Also, the BS 11 may be referred to as "megacell", "macrocell", "microcell", "picocell", "femtocell", or the like based on the size of coverage provided by the corresponding BS. A cell may be used as a term for indicating a frequency band that a BS provides, the coverage of a BS, or a BS.

Hereinafter, a downlink (DL) indicates communication or a communication path from the BS 11 to the UE 12, and an uplink (UL) indicates communication or a communication path from the UE 12 to the BS 11. In the downlink, a transmitter may be a part of the BS 11, and a receiver may be a part of the UE 12. In the uplink, a transmitter may be a part of the UE 12, and a receiver may be a part of the BS 11.

A multiple access scheme applied to the wireless communication system 10 is not limited to a specific scheme. For example, the wireless communication system may utilize various multiple access schemes, such as code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, OFDM-CDMA, and the like. Uplink transmission and downlink transmission may be performed based on a time division duplex (TDD) scheme that performs transmission at different times, or based on a frequency division duplex (FDD) scheme that performs transmission at different frequencies.

Hereinafter, in the following table 1 and table 2, acronyms used in the present specification will be defined. Also, for example, V2X indicates V2V, V2P, and V2I/N, and, in association with wireless communication such as LTE and LTE-A, each acronym may cover features described as follows.

TABLE 1

V2V (vehicle-to-vehicle): cover LTE-based communication between vehicles
V2P (vehicle-to-pedestrian): cover LTE-based communication between a vehicle and a device carried by an individual (e.g., a portable terminal carried by a pedestrian, a cyclist, a driver, or passenger).

TABLE 1-continued

V2I/N (vehicle-to-infrastructure/network): cover LTE-based
communication between a vehicle and a road side
unit/network, wherein the road side unit (RSU) is a transport
infrastructure entity (entity that transmits speed notification)
implemented by an eNB or a stationary UE.

TABLE 2

AS: Access Stratum
BSR: Buffer Status Reporting
CBR: Channel Busy Ratio
D2D: Device to Device (communication)
GNSS: Global Navigation Satellite System
MAC: Media Access Control
MCS: Modulation and Coding Scheme
RLC: Radio link Control
RSU: Road Side Unit
V2X: Vehicle to X(everything)
V2V: Vehicle to Vehicle
V2P: Vehicle to Pedestrian
V2I/N: Vehicle to Infrastructure/Network
SL: Sidelink
SCI: Sidelink Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
ProSe: (Device to Device) Proximity Services
PPPP: ProSe Per-Packet Priority
PPPR: ProSe Per-Packet Reliability Downlink (DL), Uplink (UL), and Sidelink (SL) of V2X FIG. 2, FIG. 3, and FIG. 4 illustrate examples of a downlink, an uplink, and a sidelink in vehicle-to-everything (V2X).

Figure 2:
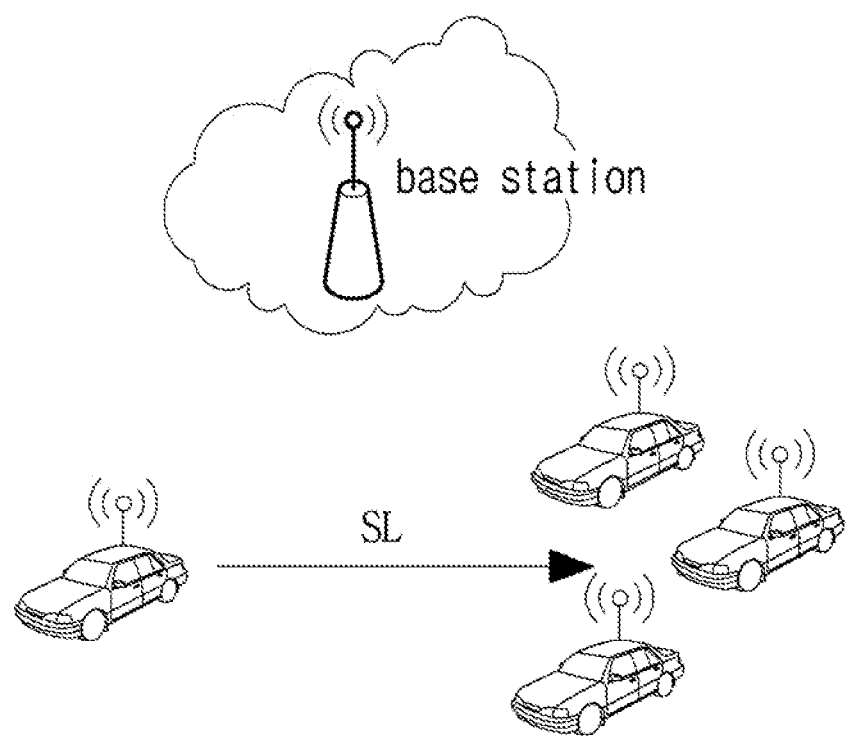
FIG. 2 illustrates an example of a link considered in vehicle-to-everything (V2X) according to an example embodiment.

In detail, referring to FIG. 2, a communication system supporting V2X may support only a PC5 link that is a link between UEs, which is defined in device-to-device (D2D) (proximity-based service (ProSe)).

The PC5 link refers to an interface defined between UEs and may be defined as a sidelink (SL) in a wireless access layer. The sidelink refers to a link in a wireless access layer for direct communication between vehicles for vehicle communication; however, it is not limited thereto.

Figure 3:
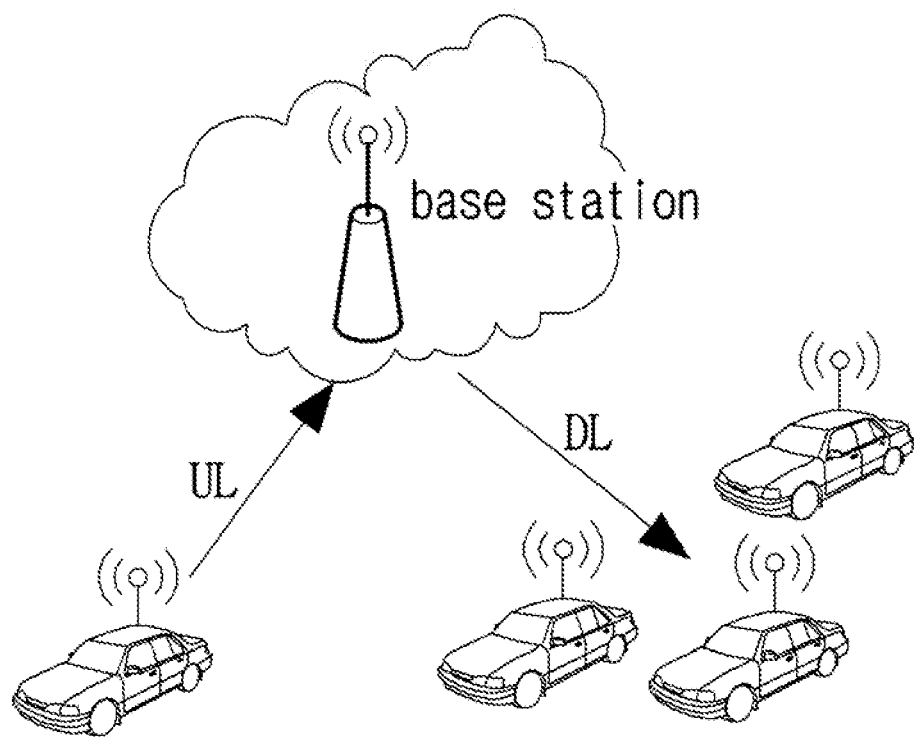
FIG. 3 illustrates another example of a link considered in V2X according to an example embodiment.

FIG. 3 illustrates another example of a link considered in V2X.

Referring to FIG. 3, a communication system supporting V2X may support only a Uu link that is a link between a base station, for example, eNodeB, and a UE or a link between a wireless access network, for example, Evolved Universal Terrestrial Access Network (E-UTRAN) and a UE. The Uu link may include an uplink (UL) that is a path through which the UE transmits a signal to the base station and a downlink (DL) that is a path through which the base station transmits a signal to the UE.

FIGS. 4A and 4B illustrate another example of a link considered in V2X.

Referring to FIGS. 4A and 4B, all of the aforementioned PC5 link and Uu link may be considered, including a road side unit (RSU) in a form of a UE. FIG. 4A illustrates an example in which the base station, for example, eNB and gNB, transmits a signal to a plurality of vehicles and FIG. 4B illustrates an example in which the UE (RSU) transmits a sidelink (SL) signal to a plurality of vehicles.

D2D communication refers to a technology that enables data to be directly transmitted and received between UEs. Hereinafter, it is assumed herein that a UE supports the D2D communication. Also, the D2D communication may be interchangeably represented with proximity-based service (ProSe) or ProSe-D2D communication. The term "ProSe" for D2D communication indicates that the proximity-based service can be added, instead of changing the aforementioned meaning of directly transmitting and receiving data between UEs.

The D2D communication may be classified into a discovery procedure for communication between an in-coverage UE that is a UE located in coverage of a network or an out-of-coverage UE that is a UE located out of coverage of the network and a direct communication procedure of transmitting and receiving control data and/or traffic data between the UEs. Hereinafter, a UE that transmits a signal based on D2D communication is referred to as a transmitting UE (Tx UE) and a UE that receives a signal based on the D2D communication is referred to as a receiving UE (Rx UE). The Tx UE may transmit a discovery signal and the Rx UE may receive a discovery signal. Roles of the Tx UE and the Rx UE may be switched. A signal transmitted from the Tx UE may be received at two or more Rx UEs.

The D2D communication may be used for various purposes. For example, the D2D communication may be used for a public safety, a traffic network service, an ultra-low latency service, and commercial service in network coverage that is based on a commercial frequency. However, in the case of a frequency dedicated for a traffic network, D2D communication through the corresponding frequency may be used only for traffic network communication and traffic safety regardless of the network coverage.

When UEs within proximate distance perform D2D communication in a cellular system, load of wireless resources for the base station may be distributed. Also, when UEs adjacent to each other perform the D2D communication, the UEs may transmit data at a relatively short distance, which may reduce the transmit power of a UE and transmission latency. In addition, existing cellular-based communication and the D2D communication use the same resources from the overall system perspective. Therefore, unless the UEs spatially overlap, it is possible to enhance the efficiency of frequency resources.

D2D Communication Scenario

D2D communication may be classified into communication between in-coverage UEs present in network coverage, for example, coverage of a base station, communication between out-of-coverage UEs located out of network coverage, and communication between an in-coverage UE and an out-of-coverage UE.

Figure 5:
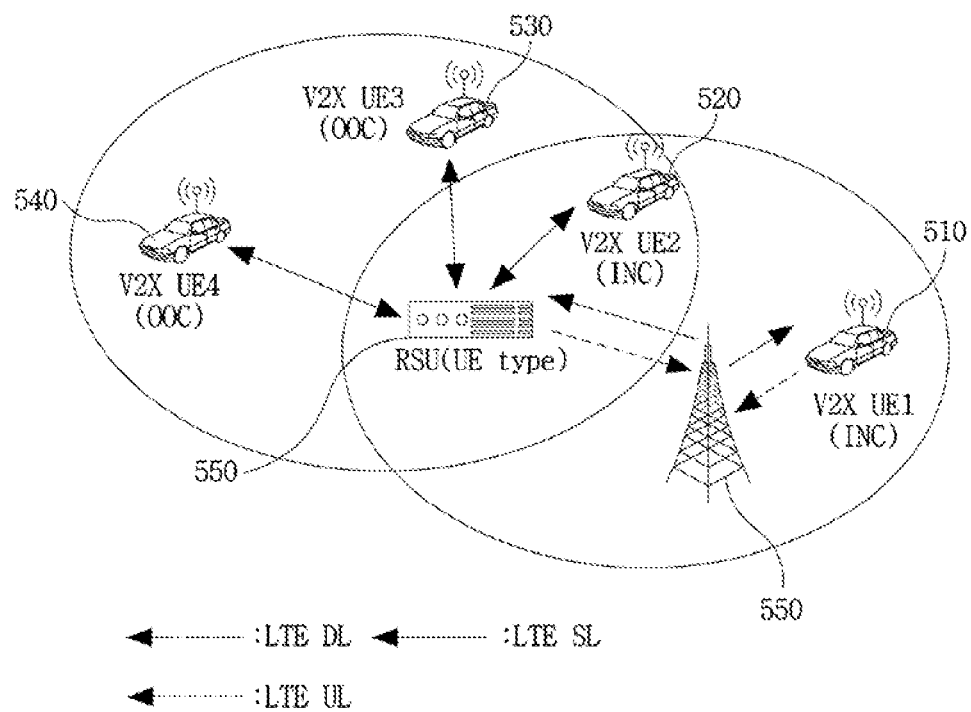
FIG. 5 illustrates an example of a device-to-device (D2D) communication scenario according to an example embodiment.

FIG. 5 illustrates an example of a D2D communication scenario according to an example embodiment.

In FIG. 5, it is assumed that a first UE (V2X UE1) and a second UE (V2X UE2) are located in network coverage and thus, are capable of communicating with a base station. The first UE and the second UE may transmit and receive data for a vehicle communication service through the base station (Uu interface). That is, the first UE and the second UE may send and/or receive data for the vehicle communication service for each other through UL data transmission and DL data reception. Here, when it is assumed that a third UE (V2X UE3) and a fourth UE (V2X UE4) are located out of a network coverage and are present at a location at which D2D communication is impossible with the first UE and the second UE, the third UE and the fourth UE may not exchange data for the vehicle communication service with the first UE and the second UE. A UE may not communicate with another UE, a base station, a server, etc., present in a region to which a signal is physically unreachable.

However, when the fourth UE located out of the network coverage need to connect the network due to the vehicle communication service or a commercial service and is capable of performing D2D communication with a UE-type RSU present in a coverage of a network service through the D2D communication, the UE-type RSU may serve as a relay and the fourth UE located out of the network coverage may transmit and receive data to and from the base station through an indirect path. That is, since the UE-type RSU performs a functionality of a relay, the fourth UE transmits vehicle communication service data to the UE-type RSU through a sidelink (SL), and the UE-type RSU transmits the vehicle communication service data to the base station through an uplink (UL) of the Uu interface. The vehicle communication service data of the fourth UE is received at/by in-coverage UEs including the first UE and the second UE through a downlink (DL) of the Uu interface.

UEs located out of coverage of the network service, including the fourth UE, and capable of performing D2D communication with the UE-type RSU, may transmit the vehicle communication service data of the fourth UE to UEs located in coverage of the network service through the UE-type RSU.

Figure 6:
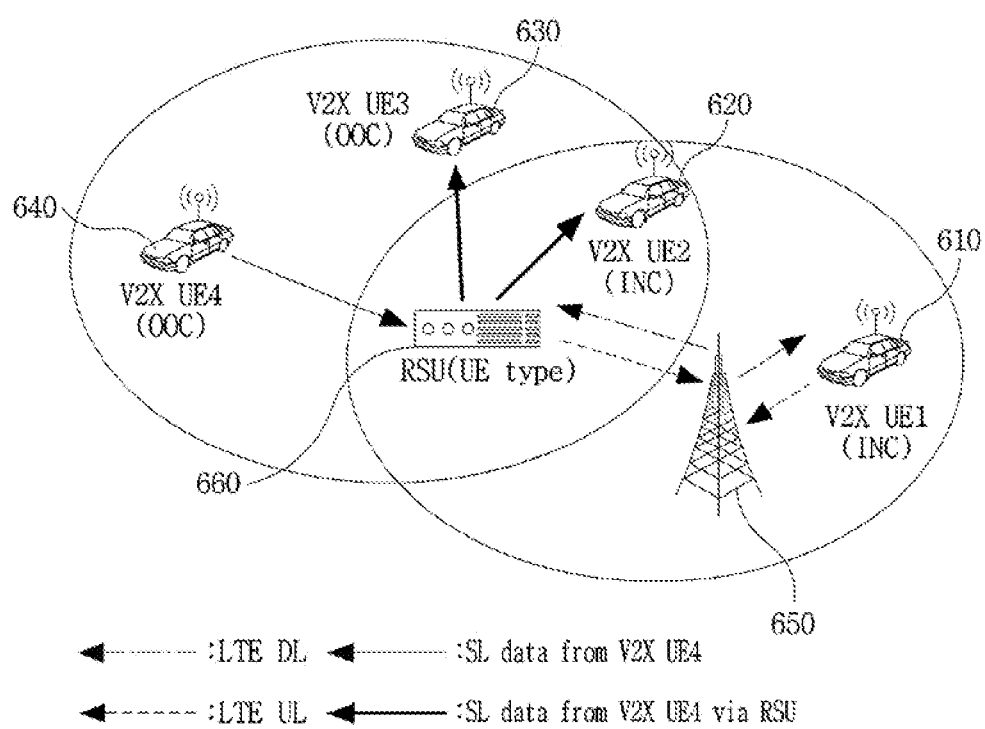
FIG. 6 illustrates another example of a D2D communication scenario according to an example embodiment.

FIG. 6 illustrates another example of a D2D communication scenario according to an example embodiment.

Referring to FIG. 6, vehicle communication service data transmitted from a fourth UE (V2X UE4) to a UE-type RSU needs to be directly transmitted to UEs present at a location at which D2D communication with the fourth UE is impossible (but capable of performing the D2D communication with the UE-type RSU) and located out of a coverage of a network service. Since a V2X service is susceptible to a latency, there is a need to decrease a latency occurring while initially transmitting data to a base station and then to the UE-type RSU. Accordingly, the UE-type RSU needs to proceed with preparation for transmitting data received from the fourth UE to the base station through a Uu (LTE uplink) interface and preparation for transmitting the data through a sidelink (SL). Accordingly, when the UE-type RSU operates in a mode in which SL resources are controlled by the base station, the vehicle communication service data received from the fourth UE needs to be treated as data to be included in an LTE-side buffer status report (BSR) and, at the same time, data to be included in SL BSR. That is, while transmitting the vehicle communication service data received from the fourth UE to a packet data convergence protocol (PDCP)/radio link control (RLC) layer in an LTE-side radio bearer (RB), the same information needs to be transmitted to a PDCP/RLC layer in an SL-side RB.

Here, in the case of a ProSe priority per packet (PPPP) of data transmitted to the SL-side RB, priority of the received packet is maintained as is. If an SL-side RB that is mapped to the priority of the received packet is absent, the UE-type RSU itself configures a new RB that supports the priority and transmits the packet.

Resource Control Method of V2X

Hereinafter, a resource control method of V2X according to an example embodiment is described.

Here, it is assumed that, every time a cell of a corresponding carrier is detected based on a specific criterion, a UE is present within reception coverage of a carrier used for V2X sidelink communication. When a UE applied for the V2X sidelink communication is present in a coverage of a frequency for the V2X sidelink communication or when a base station provides a V2X sidelink configuration at the frequency (including a case in which the UE is out of coverage at the frequency, the UE uses a resource allocation scheduled based on a base station configuration or a UE autonomous resource selection. When the UE is out of coverage of the frequency used for the V2X sidelink communication and the base station does not provide a V2X sidelink configuration corresponding to the frequency, the UE may use a Tx and Rx resource pool set that is preconfigured for the UE. Here, a UE using the scheduled resource allocation may be defined as mode 3 and a UE using the UE autonomous resource selection may be defined as mode 4.

Mode 3 (Resource Control Method by Base Station)

Mode 3 refers to a D2D resource control method by a base station. A UE may request the base station for a Tx resource to transmit data and, in response to the request, the base station may schedule the Tx resource and provide the scheduled Tx resource to the UE. The UE may perform V2X sidelink transmission using the scheduled Tx resource. A transmission format may be differently determined based on a support version, which is described below. (In the case of Rel-14 UE, a transmission format is determined based on base station scheduling information. In the case of Rel-15 UE, a corresponding UE itself determines a transmission format based on a V2X service type.

In mode 3, the base station transmits, to the UE, V2X dedicated configuration information as represented by Table 3. To this end, a signaling procedure in a radio resource control (RRC) layer, for example, an RRC connection reconfiguration message, may be used.

TABLE 3

| Type of information | Description |
|---|---|
| SL-V-RNTI | 1) Wireless resource allocation is performed through Uu link that is a wireless interface between a base station and a UE. A physical layer channel used here is a physical downlink control channel (PDCCH) and resource allocation information about a sidelink is provided through DCI included in the PDCCH. 2) Here, to receive DCI for the sidelink resource allocation, there is a need to verify that the DCI relates to the corresponding UE. For the above, ID is allocated to each UE. Here, SL-V-RNTI indicates ID applicable with limitation to vehicle communication, distinguished from general sidelink communication. |
| Tx resource pool information | Transmission (Tx) resource pool information includes the following details: 1) information about a resource included in a corresponding Tx resource pool among time/frequency resources constituting the entire carrier A. This information may represent subframes included in the Tx resource pool in a bitmap form. For example, a subframe corresponding to a bit indicated with '1' on a bitmap with a length of 40 is included in the corresponding Tx resource pool and a subframe corresponding to a bit indicated with '0' is not included in the Tx resource pool. B. The bitmap iteratively applies to the entire frames. For example, when a single frame includes 10 subframes and a system includes a total of 1024 frames, a total of 10240 subframes may be configured. Here, a bitmap with a length of |

TABLE 3-continued

| Type of information | Description |
|---|---|
| | 40 may iteratively apply to the entire frames 256 times (40 × 256 = 10240).<br>C. Also, a frequency resource is represented as information regarding a number of resource blocks (RB) that are included in a subchannel form.<br>2) ID information about a zone to which a Tx resource pool applies.<br>A. Each zone ID represents a zone in a different cell and information about each zone is provided to a UE through system information or RRC signaling. For example, each zone may be defined as a rectangular shape that represents a portion of road, and may be identified based on a geographical location, such as a global positioning system (GPS). |
| Priority information | 1) A maximum of four values among values of 1 to 8 may be included as a priority value included in a logical channel group that includes a logical channel corresponding to each radio bearer (RB).<br>2) Prose Per-Packet Priority (PPPP) may be classified into a total of eight different priority values and a priority value corresponding to each PPPP may correspond to a value among 1 to 8. Accordingly, in the case of generating a new logical channel in response to occurrence of sidelink data, a UE may determine a logical channel group to which the logical channel is to be included, based on a corresponding priority value based on PPPP of the sidelink data.<br>3) The lower the priority value, the higher the priority.<br>4) The logical channel group refers to a basic unit used when the UE reports to a base station about a buffer status in the case of configuring a BSR about a Tx sidelink. |
| MCS information | 1) Modulation coding scheme (MCS) value set as default in layer 1 (L1, physical layer) with respect to data that is transmitted through a vehicle communication sidelink.<br>2) In the case of performing dynamic and semi-persistent scheduling (SPS) resource allocation through DCI 5 series that is L1 sidelink resource allocation information transmitted from the base station to the UE through Uu interface, an MCS value may be provided. When the MCS value is provided, the MCS information provided through RRC signaling may be ignored. |

Mode 4 (Control Resource Method by UE)

Mode 4 refers to a D2D resource control method by a UE. Detailed configuration information about a Tx resource pool for mode 4 may be configured as the same as detailed configuration information about the Tx resource pool for mode 3.

Here, in mode 4, a plurality of pieces of Tx resource pool information may be provided in a list form (SL-CommTxPoolListV2X). If necessary, the base station may configure a new Tx resource pool operable in mode 4 or may transmit an RRC connection reconfiguration message for releasing a portion of preconfigured Tx resource pools. Also, the UE may autonomously select a portion of resources to be used for actual V2X data transmission from among resources included in the Tx resource pool and the base station may transmit, to the UE, reference parameter information that is a criterion for such a selection of the UE.

For example, in mode 4, the base station may provide information represented as Table 3 to the UE through the RRC connection reconfiguration message, which is similar in mode 3.

As another example, in mode 4, the UE that is in an RRC idle mode may receive, from the base station, a system information block (referred to as V2X service-related system information) including information associated with the vehicle communication service and the UE may configure the Tx resource pool based on the information by itself.

For example, the V2X service-related system information block may be SIB21 of Table 4 and SIB22 of Table 5.

SIB21 of Table 4 may include a variety of configuration information (hereinafter, referred to as V2X common configuration information (V2X-ConfigCommon)) about V2X sidelink communication. Additional information not included in SIB21 may be configured in SIB22 of Table 5.

For example, SIB21 and SIB22 may include the same carrier information or may include different carrier information. If SIB21 and SIB22 include the same carrier information, carrier configuration information not included in SIB21 may be included in SIB22. That is, only delta information may be included in SIB22. If SIB21 and SIB22 include different carrier configuration information, a different piece of carrier configuration information may be included in each SIB.

TABLE 4

```
-- ASN1START
SystemInformationBlockType21-r14 : := SEQUENCE {
    sl-V2X-ConfigCommon-r14           SL-V2XConfigCommon-r14           OPTIONAL,    --Need OR
    lateNonCriticalExtension          OCTET STRING                     OPTIONAL,
    ...
}
SL-V2X-ConfigCommon-r14 : := SEQUENCE {
    v2x-CommRxPool-r14                SL-CommRxPoolListV2X-r14         OPTIONAL,    -- Need OR
    v2x-CommTxPoolNormalCommon-r14    SL-CommTxPoolListV2X-r14         OPTIONAL,    -- Need OR
    v2x-CommTxPoolNormalCommon-r14    SL-CommTxPoolListV2X-r14         OPTIONAL,    -- Need OR
    v2x-CommTxPoolExeptional-r14      SL-CommRewourcePoolV2X-r14       OPTIONAL,    -- Need OR
    v2x-SyncConfig-r14                SL-SyncConfigListV2X-r14         OPTIONAL,    -- Need OR
    v2x-InterFreqInfoList-r14         SL-InterFreqInfoListV2X-r14      OPTIONAL,    -- Need OR
    v2x-ResourceSelectionConfig-r14   SL-CommTxPoolSensingConfig-r14   OPTIONAL,    -- Need OR
```

TABLE 4-continued

| | | | |
|---|---|---|---|
| zoneConfig-r14 | SL-zoneConfig-r14 | OPTIONAL, | -- Need OR |
| typeTxSync-r14 | SL-TypeTxSync-r14 | OPTIONAL, | -- Need OR |
| thresSL-TxPrioritization-r14 | SL-Priority-r13 | OPTIONAL, | -- Need OR |
| anchorCarrierFreqList-r14 | SL-AnchorCarrierFreqList-V2X-r14 | OPTIONAL, | -- Need OR |
| offsetDFN-r14 | INTEGER (0 .. 1000) | OPTIONAL, | -- Need OR |
| Cbr-commonTxConigList-r14 | SL-CBR-CommonTxConfigList-r14 | OPTIONAL | -- Need OR |
| } | | | |
| -- ASN1STOP | | | | anchorCarrierFreqList: describes a carrier frequency that includes an inter-carrier resource configuration for V2X sidelink communication.

cbr-CommonTxConfigList: describes a common list of a channel busy ratio (CBR) range and a physical sidelink shared channel (PSSCH) transmission parameter configuration list capable of configuring UE congestion control for V2X sidelink communication.

offsetDFN: describes a timing offset for a UE to determine a direct frame number (DFN) timing when a global navigation satellite system (GNSS) is used based on a timing of PCell.

v2x-ResourceSelectionConfig: describes a V2X sidelink communication resource used for a UE to select a resource by itself.

v2x-SyncConfig: describes a configuration that allows a UE to receive and transmit synchronization information for V2X sidelink communication. E-UTRAN configures v2x-SyncConfig that includes a transmission parameter when configuring a UE to transmit synchronization information.

zoneConfig: describes a zone configuration used for V2X sidelink communication.

TABLE 5

| | | | |
|---|---|---|---|
| -- ASN1START | | | |
| SystemInformationBlockType22-r15 ::= SEQUENCE { | | | |
| v2x-InterFreqInfoList-r15 | SL-InterFreqInfoListV2X-r14 | OPTIONAL, | -- Need OR |
| cbr-pssch-TxConifgList-r15 | SL-CBR-PPPP-TxConfigList-r15 | OPTIONAL, | -- Need OR |
| v2x-PacketDuplicationConfig-r15 | SL-V2X-PacketDuplicationConfig-r15 | OPTIONAL, | -- Need OR |
| syncFreqList-r15 | SL-V2X-SyncFreqList-r15 | OPTIONAL, | -- Need OR |
| slss-TxMultiFreq-r15 | ENUMERATED {true} | OPTIONAL, | -- Need OR |
| v2x-FreqSelectionConfigList-r15 | SL-V2X-FreqSelectionConfigList-r15 | OPTIONAL, | -- Need OR |
| ... | SL-CommTxPoolSensingConfig-r14 | OPTIONAL, | -- Need OR |
| } | | | |
| -- ASN1STOP | | | | p2x-CommTxPoolNormalCommon: describes a resource that enables a UE to transmit P2X related V2X sidelink communication. A zone ID is not configured in a pool of this field.

thresSL-TxPrioritization: describes a threshold used to determine a priority of a packet when SL V2X transmission overlaps uplink transmission in time. This value overwrites thresSL-Tx Prioritization configured in SL-V2X-Preconfiguration.

typeTxSync: describes a priority synchronization type (i.e., eNB or GNSS) for performing V2X sidelink communication at a carrier frequency that is broadcast.

v2x-CommRxPool: describes a resource that is allowed to receive V2X sidelink communication when a UE is in an RRC_IDLE and RRC_CONNECTED mode.

v2x-CommTxPoolExceptional: describes a resource that enables a UE to transmit V2X sidelink communication in an exception condition.

v2x-CommTxPoolNormalCommon: describes a resource capable of transmitting P2X-related V2X sidelink communication when the UE is in an RRC_IDLE or RRC_CONNECTED mode and used when transmitting V2X sidelink communication through a frequency aside from main. E-UTRAN configures a single resource pool for each zone.

v2x-InterFreqInfoList: describes neighboring frequency synchronization and resource allocation configuration for V2X sidelink communication.

cbr-pssch-TxConfigList: describes PPPP, CBR range, and a mapping between PSSCH transmission parameter and CR limit using an index of entry of cbr-Range-CommonConfigList included in SIB21 and uses an entry index of sl-CBR-PSSCH-TxConfigList included in SIB21. A configuration of this field applies to all of resource pools of all carriers included in SIB22 for V2X sidelink communication transmission.

slss-TxMultiFreq: describes whether a UE is capable of transmitting SLSS in a plurality of carriers for V2X sidelink communication. If this field is empty, the UE may transmit SLSS only in a synchronization carrier.

syncFreqList: describes a list of candidate carriers to be used for synchronization of V2X sidelink communication.

v2x-FreqSelectionConfigList: describes configuration information about a carrier selection for V2X sidelink communication transmission.

v2x-PacketDuplicationConfig: describes configuration information about sidelink packet duplication for V2X sidelink communication.

v2x-InterFreqInfoList: If this field includes a carrier included in SIB21 and a partial configuration of the corresponding carrier is already included in SIB21, a configuration corresponding to the corresponding carrier is not included in this field.

If it is impossible to receive reference parameter information from a base station, such as a case in which the base station does not provide the reference parameter information or a case in which the UE is in an RRC IDLE mode or is out of network coverage, the UE may perform a resource selection operation within a Tx resource pool based on parameter information stored in an internal memory. Such preconfiguration information of V2X may be represented by Table 6 (SL-V2X-Preconfiguration information elements).

TABLE 6

```
-- ASN1START
SL-V2X-PreconfigFreqList-r14 ::= SEQUENCE {
    v2x-PreconfigFreqList-r14              SL-V2X-PreconfigFreqList-r14,
    anchorCarrierFreqList-r14              SL-AnchorCarrierFreqList-V2X-r14
    OPTIONAL,
    cbr-PreconfigList-r14                  SL-CBR-PreconfigTxConfigList-r14
    OPTIONAL,
    ...,
    [[ v2x-PacketDuplicationConfig-r15     SL-V2X-PacketDuplicationConfig-r15
    OPTIONAL,
        syncFreqList-r15                   SL-V2X-SyncFreqList-r15         OPTIONAL,
        slss-TxMultiFreq-r15               ENUMERATED {true}
    OPTIONAL,
        v2x-TxProfileList-r15              SL-V2X-TxProfileList-r15        OPTIONAL
    ]]
}
SL-CBR-PreconfigTxConfigList-r14 ::= SEQUENCE {
    cbr-RangeCommonConfigList-r14 SEQUENCE (SIZE (1..maxSL-V2X-CBRConfig2-r14))
OF SL-CBR-Levels-Config-r14,
    sl-CBR-PSSCH-TxConfigList-r14 SEQUENCE (SIZE (1..maxSL-V2X-TxConfig2-r14))
OF SL-CBR-PSSCH-TxConfig-r14
}
SL-V2X-PreconfigFreqList-r14 ::= SEQUENCE        (SIZE (1..maxFreqV2X-r14)) OF
SL-V2X-PreconfigFreqInfo-r14
SL-V2X-PreconfigFreqInfo-r14 ::= SEQUENCE {
    v2x-CommPreconfigGeneral-r14           SL-PreconfigGeneral-r12,
    v2x-CommPreconfigSync-r14              SL-PreconfigV2X-Sync-r14
    OPTIONAL,
    v2x-CommRxPoolList-r14                 SL-PreconfigV2X-RxPoolList-r14,
    v2x-CommTxPoolList-r14                 SL-PreconfigV2X-TxPoolList-r14,
    p2x-CommTxPoolList-r14                 SL-PreconfigV2X-TxPoolList-r14,
    v2x-ResourceSelectionConfig-r14            SL-CommTxPoolSensingConfig-r14
    OPTIONAL,
    zoneConfig-r14              SL-ZoneConfig-r14                   OPTIONAL,
    syncPriority-r14            ENUMERATED {gnss, enb},
    thresSL-TxPrioritization-r14    SL-Priority-r13                 OPTIONAL,
    offsetDFN-r14               INTEGER (0..1000)                   OPTIONAL,
    ...,
    [[ v2x-FreqSelectionConfigList-r15    SL-V2X-FreqSelectionConfigList-r15    OPTIONAL
    ]]
}
SL-PreconfigV2X-RxPoolList-r14 ::=          SEQUENCE                    (SIZE
(1..maxSL-V2X-RxPoolPreconf-r14)) OF SL-V2X-PreconfigCommPool-r14
SL-PreconfigV2X-TxPoolList-r14 ::=          SEQUENCE                    (SIZE
(1..maxSL-V2X-TxPoolPreconf-r14)) OF SL-V2X-PreconfigCommPool-r14
SL-V2X-PreconfigCommPool-r14 ::=          SEQUENCE {
-- This IE is same as SL-CommResourcePoolV2X with rxParametersNCell absent
    sl-OffsetIndicator-R14          SL-OffsetIndicator-R12      OPTIONAL,
    sl-Subframe-r14                             SubframeBitmapSL-r14,
    adjacencyPSCCH-PSSCH-R14                    BOOLEAN,
    sizeSubchannel-r14              ENUMERATED {
                                    n4, n5, n6, n8, n9, n10, n12, n15, n16, n18, n20, n25
n30,
                                    n48, n50, n72, n75, n96, n100, spare13, spare12,
spare11,
                                    spare10, spare9, spare8, spare7, spare6, spare5, spare4,
                                    spare3, spare2, spare1},
    numSubchannel-r14                           ENUMERATED {n1, n3, n5, n8, n10, n15, n20,
spare1},
        startRB-Subchannel-r14                  INTEGER (0..99),
        startRB-PSCCH-Pool-r14                  INTEGER (0..99)             OPTIONAL,
        dataTxParameters-r14                    P0-SL-r12,
        zoneID-r14                              INTEGER (0..7)              OPTIONAL,
        threshS-RSSI-CBR-r14                    INTEGER (0..45)             OPTIONAL,
        cbr-pssch-TxConfigList-r14              SL-CBR-PPP-TxPreconfigList-r14    OPTIONAL,
        resourceSelectionConfigP2X-r14          SL-P2X-ResourceSelectionConfig-r14 OPTIONAL,
        syncAllowed-r14                         SL-SyncAllowed-r14          OPTIONAL,
        restrictResourceReservationPeriod-r14 SL-RestrictResourceRservationPeriodList-r14
        OPTIONAL, -- Need OR
        ...,
        [[      sl-MinT2ValueList-r15           SL-MinT2ValueList-r15       OPTIONAL,
                cbr-pssch-TxConfigList-v15x0    SL-CBR-PPPP-TxPreconfigList-v15x0 OPTIONAL
        ]]
}
SL-PreconfigV2X-Sync-r14 ::=SEQUENCE {
```

TABLE 6-continued

```
    syncOffsetIndicators-r14                SL-V2X-SyncOffsetIndicators-r14,
    syncTxParameters-r14                    P0-SL-r12,
    syncTxThreshOoC-r14                         RSRP-RangeSl3-r12,
    filterCoefficient-r14                   FilterCoefficient
    syncRefMinHyst-r14                          ENUMERATED {dB0, dB3, dB6, dB9, dB12},
    syncRefDiffHyst-r14                         ENUMERATED {dB0, dB3, dB6, dB9, dB12,
dBinf},
    ...,
    [[    slss-TxDisabled-r15               ENUMERATED {true}              OPTIONAL
    ]]
}
SL-V2X-SyncOffsetIndiators-r14 ::=   SEQUENCE {
    syncOffsetIndicator1-r14                SL-OffsetIndicatorSync-r14,
    syncOffsetIndicator2-r14                SL-OffsetIndicatorSync-r14,
    syncOffsetIndicator3-r14                SL-OffsetIndicatorSync-r14,    OPTIONAL
}
SL-CBR-PPP-TxPreconfigList-r14 ::=SEQUENCE        SIZE       (1..8))                    OF
SL-PPPP-TxPreconfigIndex-r14
SL-PPPP-TxPreconfigIndex-r14 ::=SEQUENCE {
    priorityThreshold-r14         SL-Priority-r13,
    defaultTxConfigIndex-r14      INTEGER(0..maxCBR-Level-1-r14),
    cbr-ConfigIndex-r14                INTEGER(0..maxSL-V2XCBRConfig2-1-r14),
    tx-ConfigIndexList-r14        SEQUENCE    (SIZE    (1..maxCBR-Level-r14))    OF
Tx-PreconfigIndex-r14
}
Tx-PreconfigIndex-r14             INTEGER(0..maxSL-V2X-TxConfig2-1-r14)
SL-CBR-PPPP-TxPreconfigList-v15x0 ::= SEQUENCE        SIZE       (1..8))    OF
SL-PPPP-TxPreconfigIndex-v15x0
SL-PPPP-TxPreconfigIndex-v15x0 ::=    SEQUENCE   (SIZE    (1..maxCBR-Level-r14))    OF
    mcs-PSSCH-Range-r15       SEQUENCE      (SIZE    (1..maxCBR-Level-r14))    OF
MCS-PSSCH-Range-r15                   OPTIONAL              --Need OR
}
MCS-PSSCH-Range-r15 ::=                   SEQUENCE{
                                          INTEGER (0..31)    OPTIONAL,        -- Need OR
                                          INTEGER (0..31)    OPTIONAL         -- Need OR
}
SL-V2X-TxProfileList-r15 ::= SEQUENCE (SIZE (1..256)) of SL-V2X-TxProfile-r15
SL-V2X-TxProfile-r15 ::=      ENUMERATED {
                                    rel14, rel15, spare6, spare5, spare4,
                                    spare3, spare2, spare1}
END
-- ASN1STOP
```

Information signaled to SIB21 and SIB22 may be included in the preconfiguration information.

Also, reference parameter information or parameter information stored in the UE may include information about a reference value based on reference signal received power (RSRP) of a PSSCH that is required to select a resource in the Tx resource pool. Here, the RSRP may correspond to an energy level of a signal in a V2X system.

Also, Tx profile information that determines a sidelink transmission format may be included. The Tx profile is further described below.

v2x-TxProfileList: describes a transmission format used as a Tx profile pointer index in each Tx profile. For each entry, a value REL14 indicates that the UE may use a Release 14 compatible format to transmit a V2X packet. A value REL15 indicates that the UE may use a Release 15 format to transmit a V2X packet.

Based on SIB21, SIB22, or preconfiguration information, a mode 4 UE may select a resource by itself as follows.

Initially, a concept of a zone is used for the UE to select a resource by itself. The zone may be configured by a base station or may be preconfigured. When the zone is configured or preconfigured, the geographical area of the earth is divided into geographical regions using a single fixed reference point (i.e., geographical coordinates (0, 0)), length, and width. Each divided region may be defined as the zone. The UE determines a zone ID using a length and a width of each zone, a number of zones, a single fixed reference point, and geographical coordinates of a current position of the UE.

Zones may be present in and out of a network coverage. If the UE is in the network coverage, the length and the width of each zone and the number of zones may be provided from the base station to the UE. If the UE is out of the network coverage, the UE may use preconfigured zone information.

Based on a mapping relationship between a Tx resource and a zone, the UE may select a V2X sidelink resource pool about a zone in which the UE is present. The UE may select a sidelink resource by performing sensing based on the selected resource pool. Here, sensing refers to a resource selection mechanism and the UE selects or reselects some specific sidelink resources based on a sensing result and reserves Tx resources. A maximum of two Tx resource reservation processes are allowed for the UE, and here, the Tx resource reservation processes are performed in parallel. However, the UE may perform only a single resource selection for V2X sidelink transmission.

In the case of mode 3 UE and mode 4 UE, a method of determining a sidelink transmission format may be different based on a UE version, which is described below. Hereinafter, the UE version is described and a method of determining a sidelink transmission format based on the UE version is described.

First Type UE, Second Type UE

A current V2X UE may be a first type UE or a second type UE. For example, the first type UE may be a V2X UE that supports Release-14 specifications as a standard. Also, the second type may be a V2X UE that supports Release-15 specifications. However, it is provided as an example only.

Compared to the Release-14 V2X UE, the Release-15 V2X UE may have the following features.

Carrier Aggregation (CA) Support

When a V2X UE supporting a sidelink i) verifies that at least two carriers or serving cells (i.e., carrier or serving cell capable of providing a V2X service through SIB and providing at least one piece of Tx resource pool information or Rx resource pool information) are available as a sidelink and ii) is capable of simultaneously transmitting and receiving data through the verified carriers or serving cells, the corresponding V2X UE may be described to support a sidelink CA.

Alternatively, when the V2X UE supporting a sidelink verifies that i) at least two serving cells are available as a sidelink and that ii) each serving cell provides available V2X carrier configuration information, and iii) is capable of simultaneously transmitting and receiving data through the verified serving cells, the corresponding V2X UE may be described to support a sidelink CA.

The sidelink CA may be supported by all of in-coverage V2X UE and out-of-coverage V2X UE. In the case of selecting a carrier, the UE may select a plurality of carriers based on a CBR value and a PPPP value of a V2X message to be transmitted.

The UE supporting the sidelink CA may perform a packet duplication of transmitting duplicated packets through different carriers. Here, a ProSe per-packet reliability (PPPR) of each V2X packet may be used as a reference of activation/deactivation of packet duplication. The PPPR may represent a reliability of a V2X packet. That is, the UE may verify a reliability required by a packet based on a PPPR value. In the case of a packet that requires a high reliability, the UE may perform packet duplication and transmit the packet using a different carrier. In this manner, the reliability requirements of the packet may be met.

New Transmission Format Support

A new transmission format may be used to support an evolved V2X service, such as platooning and a remote driving. A second type V2X UE may support a maximum data transmission rate and may enhance V2X performance using a high level of modulation and coding scheme (MCS).

The second type V2X UE may additionally support a new transmission format compared to a first type V2X UE. However, considering a V2X service for safety directly associated with the life of a driver, such as, for example, preventing a collision between vehicles and informing a risk factor of a driving path, all of the UEs need to receive a message for the safe-related service regardless of UE release/version/type.

However, if the second type V2X UE applies the new transmission format, the first type V2X UE may not receive the corresponding message. Here, the new transmission format may be a new MCS range available for the second type UE. That is, the first type UE may support MCS indices of 0 to 28 and the second type UE may support MCS indices from 0 to 31. Accordingly, compared to the first type UE, the second type UE may support a new MCS range of 29 to 31. That is, since the first type UE does not support MCS indices of 29 to 31, the first type UE may not receive a message that is transmitted using an MCS corresponding to any of the MCS indices not supported. Accordingly, UEs that support different types or releases may not coexist. To address this issue, a Tx profile may be used. Hereinafter, the Tx profile is described and a method of determining a transmission format using the Tx profile is described.

Transmission Format Determining Method of Second Type UE (Tx Profile):

A Tx profile may be used for compatibility between a first type UE and a second type UE using different transmission formats. For example, a UE may determine a transmission format for a V2X message based on an index value indicated by the Tx profile. The Tx profile may apply to each V2X message transmitted through a PC5 interface. An application layer may determine an index value of the Tx profile based on a priority of each V2X message.

For example, in the case of a safety-related V2X message, all of the UEs may need to receive the V2X message regardless of a UE type or release version. Accordingly, the application layer may need to configure a Tx profile for a first type such that the UE may apply a first type transmission format. For example, the first type may indicate Release 14 and a second type may indicate Release 15. However, it is provided as an example only.

In the case of a V2X message about a service applied between UEs of an upper version, for example, a V2X message about platooning and remote driving, the first type UE does not need to receive the V2X message about platooning and remote driving. Accordingly, the second type V2X UE may support a maximum data transmission rate and may enhance V2X performance using a new transmission format. In this case, an application layer of the UE may configure the Tx profile such that the UE may apply a second type transmission format.

Here, the Tx profile may use an index value to indicate the first type transmission format or the second type transmission format. Tx profile 1 may indicate the first type transmission format and Tx profile 2 may indicate the second type transmission format.

That is, if the Tx profile 1 is provided for each V2X message that the UE desires to transmit, the UE may set a single MCS value using a first type MCS table and may apply the set MCS value for transmission. If the Tx profile 2 is provided, the UE may set a single MCS value using a second type MCS table and may transmit a corresponding V2X message by applying a rate matching and a transport block size (TBS) scaling function. Here, selecting a single MCS value among values included in an MCS table may follow a UE implementation.

The first type MCS table may be provided as the following Table 6. The MCS for the first type may have the MCS range corresponding to indices of 0 to 31. A minimum value and a maximum value of the MCS range may be set through RRC signaling or preconfiguration information. Here, minMCS-PSSCH and maxMCS-PSSCH parameters may be used. The UE may select, from the MCS range defined based on such parameters, a single MCS index based on UE implementation. However, if the base station instructs the first type UE to use a specific MCS index through SL grant, the UE may apply a transmission format corresponding to the specific MCS index.

The first type UE may determine a modulation scheme and a TBS size based on the selected MCS index. The modulation scheme may be determined according to $Q'=\min(4, Q_m')$ and the TBS size may be determined based on parameters $I_{TBS}$ and $N_{PRB}$ that represents an allocated resource block.

TABLE 7

| MCS Index IMCS | Modulation Order | TBS Index ITBS |
|---|---|---|
| 0 | 2 | 0 |
| 1 | 2 | 1 |

TABLE 7-continued

| MCS Index IMCS | Modulation Order | TBS Index ITBS |
|---|---|---|
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 4 | 18 |
| 20 | 4 | 19 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | | reserved |
| 30 | | |
| 31 | | |

The second type MCS table may be provided as the following Table 7. The MCS for the second type may have the MCS range corresponding to indices of 0 to 31. A minimum value and a maximum value of the MCS range may be set through RRC signaling or preconfiguration information. Here, minMCS-PSSCH and maxMCS-PSSCH parameters may be used. The UE may select, from the MCS range defined based on such parameters, a single MCS index based on UE implementation. In the same manner as the first type transmission format selection method, the UE may determine a modulation scheme and a TBS size based on the selected MCS index. The modulation scheme may be determined according to $Q'=\min(4, Q_m')$, and the TBS size may be determined based on parameters $I_{TBS}$ and $N_{PRB}$ that represents an allocated resource block.

TABLE 8

| MCS Index $I_{MCS}$ | Modulation Order $Q'_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 4 | 18 |
| 20 | 4 | 19 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 6 | 30 |
| 30 | 6 | 31 |
| 31 | 6 | 33 |

However, if a plurality of V2X messages is multiplexed to a single MAC PDU, a transmission format for transmission of the MAC PDU may be determined based on a Tx profile of a V2X message having a top priority.

That is, in the case of transmitting the V2X message through a PC5 interface at all times, the UE may determine a transmission format based on the Tx profile and then transmit the V2X message.

Transmission Format Determining Method of First Type UE

The first type V2X UE may apply only a single transmission format for the first type. Accordingly, for example, when the base station instructs the UE to apply a specific MCS value, the UE may determine a transmission format based on the specific MCS value. When the base station does not instruct the UE to apply the specific MCS value, the UE may select and apply a single MCS value from among values included in the first type MCS range based on UE implementation.

Hereinafter, the overall UE operation based on an application layer that sets a Tx profile is described.

V2X UE Operation Method

Figure 7:
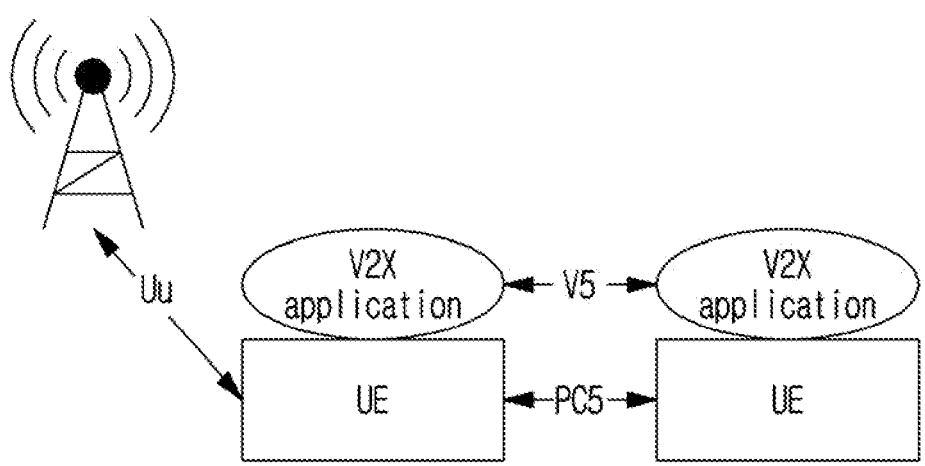
FIG. 7 illustrates an example of an overall configuration of V2X communication according to an example embodiment.

FIG. 7 illustrates an example of an overall configuration of V2X communication according to an example embodiment.

Referring to FIG. 7, a V2X UE may be configured using a V2X application and a communication protocol stack. Communication between UEs may be performed through a PC5 link and communication between a UE and a base station may be performed through a Uu link. Communication between V2X applications may be performed through a V5 link.

When a UE desires to transmit a V2X message through the PC5 interface, the UE may determine a transmission method based on a setting of an application layer. The application layer may set a PPPP and a Tx profile and/or Tx profile value for the generated V2X message and may transmit the same to an access stratum (AS) layer.

For example, when a V2X message generated by a UE application is a safety-related message, the application layer may set Tx profile 1 such that all of the UEs may receive the corresponding V2X message. In addition, the application layer may set a PPPP indicating a message priority for each V2X message and may also selectively set a PPPR indicating a message reliability. The application layer of the UE may transmit the V2X message, the Tx profile, and the PPPP to the AS layer, and may selectively transmit the PPPR to the AS layer.

In response to receiving the Tx profile, the PPPP, the PPPR, and the V2X message, the AS layer may verify the priority and the reliability of the V2X message and may map the V2X message to be transmitted to an appropriate sidelink radio bearer (SLRB). PDCP, RLC, MAC, and PHY layers of the UE may receive the V2X message through the AS layer and may prepare to transmit the V2X message and then perform the transmission.

The PDCP layer of the UE may compress an IP header and perform encryption. Next, the PDCP layer of the UE may transmit a corresponding packet to the RLC layer. The RLC layer of the UE may receive the packet may perform segmentation/junction of the packet.

Also, the UE may select a logical channel used to transmit the V2X message based on the PPPP of the V2X message and may select a carrier used to transmit the V2X message based on PPPP and CBR value. Here, the carrier indicates a frequency band.

Also, the UE determine activation or deactivation of sidelink packet duplication based on the PPPR of the V2X message. Here, the PPPR may be selectively provided.

Also, the UE may determine the transmission format based on the Tx profile of the V2X message.

However, here, the PPPR and the Tx profile may be applicable only to the second type V2X UE and the application layer that supports the first type UE may not set the value. Also, the PPPR may be used only for packet duplication. Therefore, even the application layer that supports the second type UE may not set a PPPR value for a packet that does not require packet duplication. That is, if the PPPR value is not set, the UE may not perform packet duplication. However, since the PPPP value is associated with a selection of a logical channel and a selection of a carrier, the PPPP needs to be set by the application layer for each V2X message at all times regardless of a UE version. Also, the Tx profile may need to be set to the second type V2X UE at all times as a standard to determine a transmission format for each V2X message.

Example

To implement V2X communication, various types of developments in the fields of, for example, application, road, data security, etc., as well as wireless communication are required. Accordingly, the development of each technique may be individually performed. Here, supporting versions may not match. For example, a V2X UE may be released with an application being implemented as Rel-14 although wireless communication supports a Rel-15 standard into consideration of a following application update.

Alternatively, the Rel-14 V2X UE may be updated with a Rel-15 version. In this case, as described above, since the development of wireless communication and the development of an application may be individually performed, the application may be Rel-14 as is although Rel-15 V2X wireless communication standard is supported.

Alternatively, the primary purpose of a vehicle application is to control a vehicle. If an error occurs in a vehicle control system of a new application version, the application layer of the UE may be converted to an existing application version of which safety is ensured to guarantee the safety of the vehicle. In this case, although the Rel-15 V2X wireless communication standard is supported, the application may be Rel-14.

Figure 8:
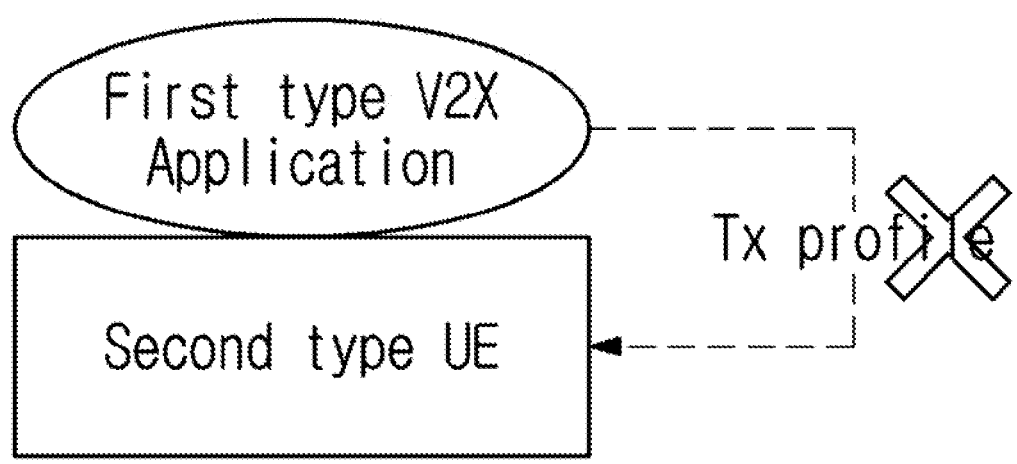
FIG. 8 illustrates an example in which a type of a communication protocol supported by a user equipment (UE) and a type of an application supported by the UE are different according to an example embodiment.

FIG. 8 illustrates an example in which a type of a communication protocol supported by a UE and a type of an application supported by the UE are different according to an example embodiment.

Referring to FIG. 8, a second type V2X UE may be configured using a communication protocol that supports second type V2X and an application that supports first type V2X operation. Here, for example, as described above, the first type may be Rel-14 and the second type may be Rel-15. However, it is provided as an example only. That is, it may apply to a case in which a type of a communication protocol that supports V2X operation and a type of an application that supports the V2X operation are different.

For example, the second type V2X UE may not receive Tx profile information and PPPR information. As described above, since a PPPR is selectively provided, the second type V2X UE may operate without having a difficulty. However, if the Tx profile is not provided, the corresponding UE may not readily determine a transmission format. If a UE randomly selects the transmission format by itself, some UEs may not receive an important message, which may lead to causing a serious issue. Accordingly, to prevent the occurrence of such an issue, there is proposed a UE operation in a case in which the Tx profile is not provided.

Figure 9:
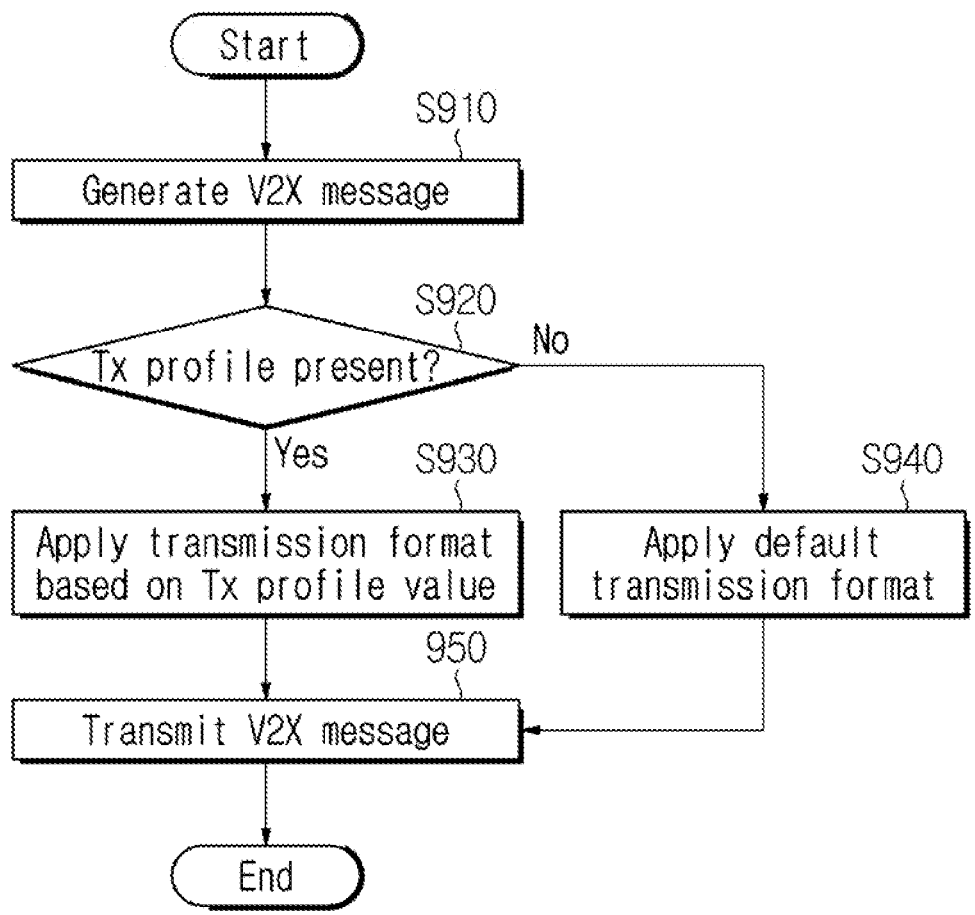
FIG. 9 is a flowchart illustrating an example of a UE operation according to an example embodiment.

FIG. 9 is a flowchart illustrating an example of a UE operation according to an example embodiment, based on the aforementioned description.

According to the example embodiment, if a V2X UE does not receive Tx profile information from an upper layer, a default transmission format may be applied such that all of the UEs may receive a V2X message at all times. Here, the default transmission format refers to a first type transmission format.

Describing in detail, a second type V2X UE may operate as follows.

For example, in operation S910, a UE may generate a notification message, for example, a V2X message, by detecting a dangerous situation through a sensor in a specific situation. Here, as described above with reference to FIGS. 1 to 8, an application layer of the UE may verify a service that is associated with the V2X message. If the application layer of the UE supports second type V2X, the application layer may set PPPP and Tx profile values for the V2X message in operation S920. The application layer of the UE may transfer, to an AS layer, the set PPPP and Tx profile values with the V2X message and the UE may perform the following operation to transmit the V2X message.

For example, a mode 3 UE may request a base station for a Tx resource through a sidelink BSR. Based on the sidelink BSR, the base station may verify an amount of data to be transmitted by the UE and may determine a resource required for transmission. The base station may schedule a Tx resource required for data transmission and sidelink control information using a configured SL-V-RNTI and provide the scheduled Tx resource to the UE. In response to receiving the resource, the UE may configure a MAC PDU based on the allocated scheduling resource and may determine a transmission format according to a Tx profile of data having a top priority in a MAC PDU in operation S930 and may perform a sidelink transmission in operation S950. That is, the mode 3 UE may determine a transmission format based on Tx profile information instead of using scheduling information of the base station. Here, the sidelink communication may be performed in a subframe that is defined as a sidelink control period of the UE. The sidelink control period refers to a period in which a resource allocated to a cell for sidelink control information and sidelink data transmission occurs. In the sidelink control period, the UE may transmit sidelink data and sidelink control information. Here, the control information may include Layer1 ID, MCS, TA value, and resource location information.

As another example, a mode 4 UE may select a resource from a resource pool that is configured by the base station based on system information or a preconfigured resource pool. Each resource pool is associated with one or more PPPP. Accordingly, the UE may select a Tx resource pool based on PPPP of a logical channel having a top priority in the MAC PDU to be transmitted and may determine a transmission format based on a Tx profile value of a V2X message having a top priority in operation S930. The MCS range (a first type transmission format or a second type transmission format) may be determined based on the Tx profile value received from the application layer and the UE may select a single value from the MCS range. In operation S950, the UE may perform a sidelink transmission based on the resource pool selected in the sidelink control period and the transmission format. Here, once the resource pool is selected, the resource pool is valid only during the sidelink control period. After expiry of the sidelink control period, the UE may perform the resource pool selection process again.

That is, the mode 3 UE and the mode 4 UE have a difference therebetween with respect to the Tx resource selection method and have a similarity in that the transmission format is determined based on the Tx profile value of the UE without control of the base station.

However, if the application layer of the UE does not support a second type V2X function, the application layer of the UE may transmit only a V2X message and a PPPP value in operation S920. In this case, the UE may be unaware of the purpose of the V2X message, a service associated with the V2X message, and a receiver of the V2X message and thus, may not readily determine a transmission format for the V2X message accordingly. Therefore, a UE operation that applies an appropriate transmission format without receiving a Tx profile is required.

That is, if the UE does not receive a Tx profile value for the V2X message to be transmitted, the UE may perform transmission by applying a default transmission format, for example, the first type transmission format, such that all of the UEs may receive the V2X message in operation S940.

Describing in detail, the second type UE may apply all of the first type transmission format and the second type transmission format. That is, the second type UE may transmit the V2X message by applying a single transmission format between the first type transmission format and the second type transmission format.

Here, the UE may consider a receiver of a message as criterion to select the transmission format. If all of the V2X UEs including the first type UE and the second type UE need to receive the V2X message to be transmitted, the second type UE may apply the first type transmission format. If the V2X message to be transmitted is a message that is transmitted to the second type UE, the UE may apply the second type transmission format.

Here, the receiver of the message may be determined based on a V2X service. The V2X service may follow whether the application layer of the UE supports a corresponding service and the application layer of the UE may verify a service of the generated V2X message. For example, if the application layer of the UE supports a safety service that is one of first type V2X functions and the UE generates a V2X message for safety, the application layer of the UE may instruct the UE to apply the first type transmission format through the Tx profile such that all of the V2X UEs may receive the V2X message. When the application layer of the UE supports a platooning/remote driving service that is a second type V2X function and the UE generates a V2X message for the service, the application layer of the UE may instruct the UE to apply the second type transmission format through the Tx profile. Through this, it is possible to enhance transmission performance using a relatively small amount of resources and high throughput.

However, if fallback to an existing V2X application occurs due to an error of the vehicle control system, the application layer of the UE may not support the second type V2X function although the UE supports all of the first type transmission format and the second type transmission format. Here, a service for the second type V2X function is not supported at the UE and thus, even the second type UE may not generate a message for the service. Also, the Tx profile is not supported.

Accordingly, in this case, a V2X message generated by the second type UE may be a message for all of the V2X UEs, such as a V2X message generated by the first type UE. However, as described above, regardless of whether the application layer supports the second type V2X function, the second type UE may still use the first type transmission format and the second type transmission format. Therefore, if the UE arbitrarily selects a transmission format in this situation, the UE may transmit the V2X message by applying the second type transmission format even with respect to data that is to be received by all of the V2X UEs. Here, some UEs, for example, the second type UE, may not receive the V2X message, which may cause problems.

In this case, the second type UE should not select freely a transmission format based on UE implementation. The second type UE may verify that the application layer of the UE does not support a second type function when Tx profile information is unavailable. Here, a UE operation needs to be defined such that the UE may apply the first type transmission format at all times.

In the case of the MAC PDU transmitted through the aforementioned transmission method, all of the UEs may successfully receive the MAC PDU regardless of a UE version.

Figure 10:
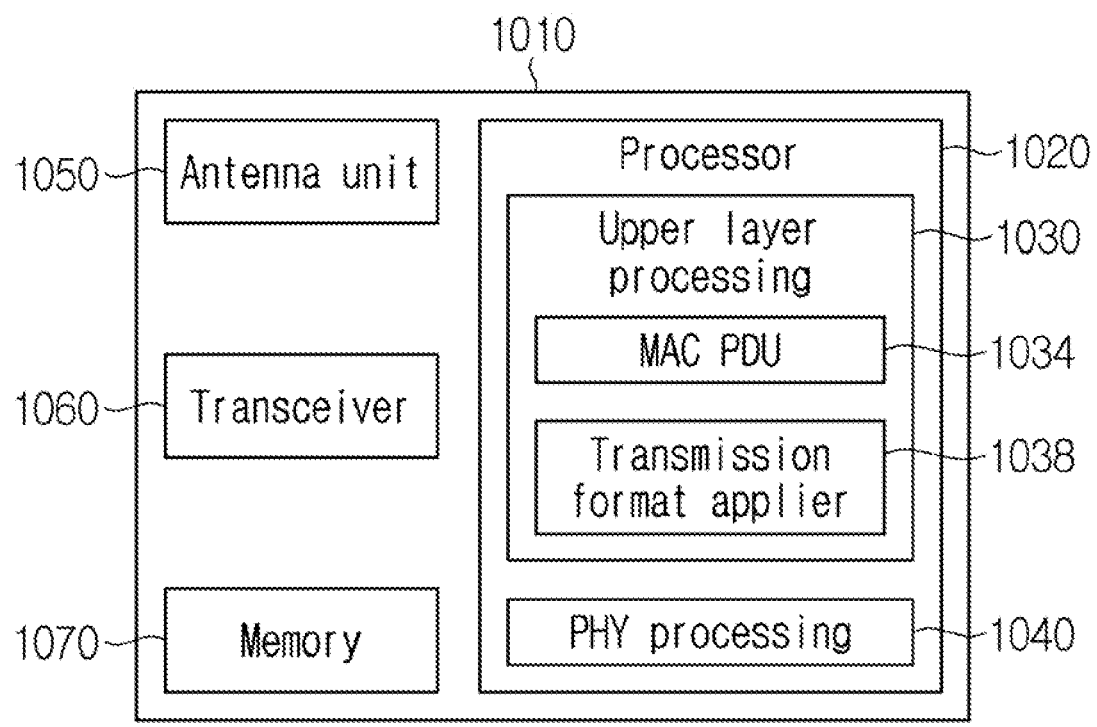
FIG. 10 is a block diagram illustrating an example of a configuration of a UE apparatus according to an example embodiment.

FIG. 10 is a block diagram illustrating an example of a configuration of a UE apparatus according to an example embodiment.

The UE according to the example embodiments may operate based on the UE apparatus of FIG. 10.

For example, referring to FIG. 10, a UE apparatus 1010 may include a processor 1020, an antenna unit 1050, a transceiver 1060, and a memory 1070. Here, the aforementioned components may be selectively included and are not limited thereto. For example, the processor 1020 performs baseband-related signal processing and may include an upper layer processing 1030 and a PHY layer processing 1040. The upper layer processing 1030 may process an operation of a medium access control (MAC) layer, a radio resource control (RRC) layer, or more upper layer. The PHY layer processing 1040 may process an operation of a PHY layer, for example, MAC PDU transmission. The antenna unit 1050 may include at least one physical antenna. When the antenna 1050 includes a plurality of antennas, the antenna unit 1050 may support multiple input multiple output (MIMO) transmission and reception. The transceiver 1060 may include a radio frequency (RF) transmitter and an RF receiver. The memory 1070 may store operation processed information of the processor 1020, application, OS, software, etc., associated with a UE operation, and may also include component such as a buffer. The aforementioned components may be a software configuration as a logical entity.

The processor 1020 of the UE apparatus 1010 may be set to implement the UE operation in the example embodiments described herein. For example, the UE apparatus 1010 may generate a MAC PDU based on a V2X message and Tx profile information received from an application layer using a MAC PDU generator 1034 included in the upper layer processing 1030, and may apply a transmission format using a transmission format applier 1038. The UE apparatus 1010 may transmit the information to the PHY layer processing 1040 and the PHY layer processing 1040 may transmit the MAC PDU through a PC5 link. However, when Tx profile information corresponding to the V2X message is not received from the application layer, the transmission format applier 1038 may apply a default format.

According to an example embodiment of the present disclosure, an application layer may verify data arrival and then determine (set or configure) Tx profile information based on a service. The application layer determines a transmission format for the data transmission based on the set Tx profile information and controls the data to be transmitted through the determined transmission format. Here, a process of determining the transmission format for the data transmission may include a process of selecting an MCS index group including indices of different ranges based on the Tx profile information.

For example, according to an example of the present disclosure, in the case of determining the Tx profile information as 1, a process of determining the Tx profile information includes a process of selecting the use of a first type transmission format for the data. The first type transmission format may select one of MCS indices ranging from 0 to 28. Meanwhile, in the case of determining the Tx profile information as 2, the process of determining the Tx profile information includes a process of selecting the use of a second type transmission format. The second type transmission format may include a process of selecting one of MCS indices ranging from 0 to 31.

Here, the process of determining the Tx profile information as 2 may be used to transmit data and a service message for an evolved V2X service, such as platooning and a remote driving. Meanwhile, the process of determining the Tx profile information as 1 may be used to support a default V2X service to ensure safety.

Accordingly, an application layer of a Tx UE may determine a PPPP and a PPPR for the data and Tx profile information for data transmission according to the service and may transfer, to an AS layer, the determined PPPP, PPPR, and Tx profile information, and accordingly, may control the MAC PDU generator 1034 to generate MAC PDU and the transmission format applier 1038 to apply a transmission format.

Here, the Tx UE may determine the Tx profile information as 1 for unspecific Rx UEs in a cell and may set the Tx profile information 1 as a default Tx format. The Tx UE may select a transmission resource based on a PPPP of a logical channel having priority of the data from a set transmission resource pool and may select the transmission profile based on a Tx profile value of a V2X message having the top priority. The determined transmission format for the data transmission may be broadcasted for unspecified UEs within a cell.

Meanwhile, the upper layer processing 1030 and the PHY layer processing 1040 of the processor 1020 may be a software configuration. Therefore, the aforementioned components may be not essentially used and, instead, selectively used to configure the UE apparatus 1010. That is, the aforementioned components may be illustrated in the drawings as a logical configuration to describe the operation according to example embodiments in detail and may not be necessarily included and thereby implemented. Here, for clarity of description, a configuration of performing a detailed operation is described and is not limited to the aforementioned example embodiment.

In the example methods described above, processes are described as a series of operations based on a flowchart, aspects of the present disclosure are not limited to the illustrated order or sequence. Some operation may be processed in a different order or may be processed substantially simultaneously. Further, it will be understood that the illustrated operations in a flowchart do not necessarily exclude other operations, other operations may be included and one or more operations may be omitted without departing from the spirit and scope of the present disclosure.

Various embodiments of the present disclosure are not all the possible combinations and are to explain the representative aspects of the present disclosure. Thus, it will be apparent that the descriptions made in various embodiments may apply independently or combination of at least two thereof.

Also, various embodiments of the present disclosure may be implemented by hardware, firmware, software, or combinations thereof. In the case of implementation by hardware, the embodiments may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various embodiments may be executed on an apparatus or a computer, and a non-transitory computer-readable medium storing such software or instructions to be executable on an apparatus or a computer.

What is claimed is:

1. A method performed by a wireless user device, the method comprising:
   determining, by the wireless user device, a plurality of priorities of logical channels associated with a plurality of data packets in a medium access control (MAC) protocol data unit (PDU), wherein a first logical channel of the logical channels has a highest priority of the plurality of priorities, and wherein the first logical channel is associated with at least one packet of the plurality of data packets in the MAC PDU;
   determining, based on the highest priority of the first logical channel, a vehicle-to-everything (V2X) transmission profile for the highest priority to select a transmission format for all of the plurality of data packets in the MAC PDU;
   selecting a transmission format associated with the determined V2X transmission profile for the highest priority as the transmission format for all of the plurality of data packets in the MAC PDU, wherein the selected transmission format is configured to use at least one of modulation and coding scheme (MCS) indices; and
   transmitting, based on the selected transmission format, the plurality of data packets from the wireless user device to one or more wireless user devices.

2. The method of claim 1, further comprising:
   determining that a transmission profile for one or more second data packets is not configured, wherein the one or more second data packets is for transmission between wireless user devices;

selecting, based on the determining that the transmission profile for the one or more second data packets is not configured, a first transmission format associated with a first transmission profile, wherein the first transmission format is configured to use a narrower range of MCS indices comprised in a range of MCS indices configured for a second transmission format; and transmitting, based on the selected first transmission format, the one or more second data packets from the wireless user device to one or more wireless user devices.

3. The method of claim 2, wherein the determining that the transmission profile for the one or more second data packets is not configured comprises determining that the transmission profile for the one or more second data packets is not configured by an upper layer of the wireless user device, and wherein the upper layer of the wireless user device comprises an application layer of the wireless user device.

4. The method of claim 2, wherein the second transmission format is associated with at least one of:

a platooning service; or a remote driving service.

5. The method of claim 2, wherein the first transmission format is associated with a road safety service.

6. The method of claim 1, further comprising:

determining, based on one or more service types of the plurality of data packets, a plurality of transmission profiles.

7. The method of claim 1, further comprising: providing, from an application layer to an access stratum, the determined V2X transmission profile for the plurality of data packets.

8. The method of claim 1, further comprising: providing, from an application layer to an access stratum, at least one of:

ProSe Per-Packet Priority (PPPP) associated with the plurality of data packets; or ProSe Per-Packet Reliability (PPPR) associated with the plurality of data packets.

* * * * *